United States Patent [19]

Farwell et al.

[11] Patent Number: 5,082,133

[45] Date of Patent: Jan. 21, 1992

[54] LOW PRESSURE RUPTURE DISK AND ASSEMBLY

[75] Inventors: Stephen R. Farwell, Owasso; Arnold L. Mundt, Tulsa, both of Okla.

[73] Assignee: BS&B Safety Systems, Inc., Tulsa, Okla.

[21] Appl. No.: 739,303

[22] Filed: Aug. 1, 1991

[51] Int. Cl.⁵ ............................................. F16K 17/16
[52] U.S. Cl. .................................... 220/89.2; 137/68.1
[58] Field of Search ...................... 220/89.2; 137/68.1

[56] References Cited

U.S. PATENT DOCUMENTS

| | | | |
|---|---|---|---|
| 2,953,279 | 9/1960 | Coffman | 220/89.2 |
| 3,294,277 | 12/1966 | Wood | 220/89 |
| 4,236,648 | 12/1980 | Wood et al. | 220/89 A |
| 4,269,214 | 5/1981 | Forsythe et al. | 137/68 R |
| 4,576,303 | 3/1986 | Mundt et al. | 220/89 A |
| 4,580,691 | 4/1986 | Hansen | 220/89.2 |
| 4,905,722 | 3/1990 | Rooker et al. | 220/89.2 |

*Primary Examiner*—Joseph Man-Fu Moy
*Attorney, Agent, or Firm*—Laney, Dougherty, Hessin & Beavers

[57] ABSTRACT

An improved low pressure reverse buckling rupture disk and assembly are provided. The rupture disk comprises a concave-convex reversible member having a thickness and a configuration such that said member reverses when a predetermined fluid pressure is exerted on the convex side thereof and having one or more reinforcing embossments disposed therein. The rupture disk assembly includes the above-described rupture disk and knife blade means for severing the disk upon its reversal.

20 Claims, 2 Drawing Sheets

LOW PRESSURE RUPTURE DISK AND ASSEMBLY

BACKGROUND OF THE INVENTION

1. Field of the Invention

This invention relates generally to safety pressure relief apparatus, and more particularly, to an improved low pressure rupture disk and assembly.

2. Description of the Prior Art

A variety of safety pressure relief apparatus of the rupture disk type have been developed. Generally, such apparatus include a rupturable member supported between a pair of complimentary supporting members or flanges which are in turn connected to a relief connection in a vessel or system containing fluid pressure. When the fluid pressure within the vessel or system exceeds the design rupture pressure of the rupture member, rupture occurs causing fluid pressure to be relieved from the vessel or system.

Rupture disk assemblies including concave-convex reverse buckling rupture disks have been developed and used heretofore. Such disks have thicknesses and configurations such that they reverse when predetermined fluid pressures are exerted on the convex sides thereof. Prior to reversal, a reverse buckling rupture disk is in compression which allows the operating fluid pressure exerted on the disk to be relatively close to the pressure at which the disk is designed to reverse. Upon reversal, the disk ruptures thereby relieving pressurized fluid from the vessel or system being protected.

In order to prevent the formation of loose pieces upon rupture, reverse buckling rupture disk assemblies have heretofore included knife blades upon which the disk impales when reversed. One such knife blade assembly is described in U.S. Pat. No. 3,294,277 to Wood which is assigned to the assignee in the present invention. Another knife blade assembly is described in U.S. Pat. No. 4,236,648 to Wood et al., which is also assigned to the assignee of this present invention. The disclosures of the foregoing patents are incorporated in this description of the present invention by reference.

While the heretofore developed and used reverse buckling rupture disks and assemblies have operated successfully in many applications, problems have been encountered in their use in some low pressure applications. For example, in low pressure applications where vacuum conditions can exist in the vessel or system being protected but the reverse buckling rupture disk must still reverse and relieve pressure when a positive low pressure is exerted thereon, the material from which the disk is formed must be very thin, e.g., a 1 inch in diameter reverse buckling rupture disk designed to be subjected to vacuum conditions but rupture at a positive pressure below about 25 psig must be formed of stainless steel or the like having a thickness in the range of from about 1 to about 2 thousandths of an inch. As a result of the thin material from which the disk is formed, the reverse pressure brought about by the vacuum quickly causes deformation of the disk which in turn brings about premature failure or improper operation thereof.

By the present invention, improved low pressure rupture disks and rupture disk assemblies are provided wherein the rapid distortion and weakening of the disks when subjected to high heat, vacuums or other reverse or cyclic pressure conditions are prevented.

SUMMARY OF THE INVENTION

An improved low pressure reverse buckling rupture disk is provided comprising a concave-convex reversible member having a thickness and a configuration such that said member reverses when a predetermined fluid pressure is exerted on the convex side thereof. The rupture member includes one or more reinforcing embossments disposed therein which impart resistance to damage during handling and installation and to distortion and weakening when the member is subjected to a vacuum or other reverse or cyclic pressure condition.

In a preferred embodiment the rupture disk includes a plurality of embossments which are equally spaced in end-to-end relationship on a centrally positioned circular line.

A rupture disk assembly of the present invention includes the above-described rupture disk and a knife blade member positioned adjacent to the rupture disk whereby the disk is severed by the knife blade member upon the reversal thereof.

It is, therefore, a general object of the present invention to provide an improved low pressure rupture disk and assembly.

A further object of the present invention is the provision of a low pressure reverse buckling rupture disk which has increased resistance to distortion and premature failure as a result of heat, reverse pressure or other condition to which the disk is exposed.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
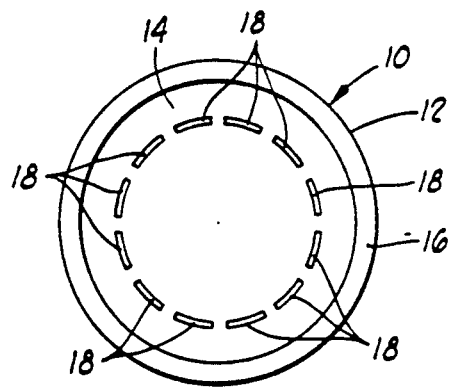
FIG. 1 is a top plan view of an embossed reverse buckling rupture disk of the present invention.
Figure 2:
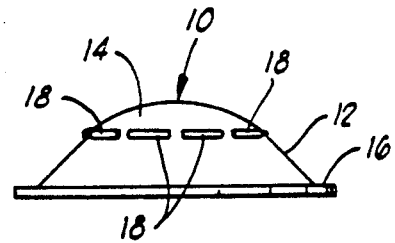
FIG. 2 is a side elevational view of the rupture disk of FIG. 1.
Figure 3:
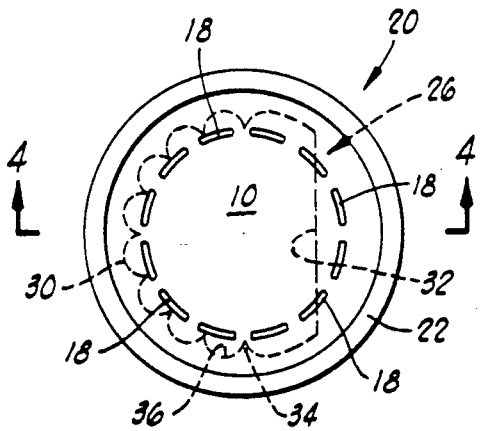
FIG. 3 is a top plan view of a rupture disk assembly including the rupture disk of FIGS. 1 and 2.

Referring now to the drawings and particularly to FIGS. 1 and 2, one form of the improved low pressure rupture disk of the present invention is illustrated and generally designated by the numeral 10. The rupture disk 10 is comprised of a concave-convex reversible member 12. In the preferred form illustrated in FIGS. 1 and 2, the member 12 includes a circular concave-convex portion 14 connected to an annular flat flange portion 16.

As is well understood by those skilled in the art, the rupture disk 10 is formed of a material, generally metal, having a thickness and a concave-convex configuration such that when a predetermined fluid pressure differential is exerted on the rupture disk 10 by way of the convex side thereof, the concave-convex portion 14 reverses itself and ruptures. In order to prevent fragmentation, the disk is preferably severed by knife blades as will be described hereinbelow.

As mentioned above, in very low pressure applications, the material from which the rupture disk 10 is formed must be very thin, e.g., stainless steel having a thickness in the range of from about 0.001 inch to about 0.002 inch. As a result, the rupture disk 10 is highly susceptible to damage when being handled and installed, e.g., exposed to high temperatures when being welded, and to distortion in operation, any one of which can bring about a rapid premature failure of the rupture disk. In order to strengthen the rupture disk and to reduce or prevent such damage and/or distortion, the concave-convex portion 14 of the rupture disk 10 is reinforced by one or more embossments formed therein. In a presently preferred embodiment illustrated in FIGS. 1 and 2, the concave-convex portion 14 of the rupture disk 10 includes a plurality of embossments 18 which are equally spaced in end-to-end relationship on a line defining a centrally positioned circle in the concave-convex portion 14. The location of the circular line on which the embossments are positioned can vary, but generally it is positioned about half-way between the periphery of the concave-convex portion 14 and the center of the rupture disk 10.

The embossments 18 are conveniently formed in the rupture disk 10 by conventional die stamping equipment. The particular location, length, width, height and spacing of the embossments 18 can vary over a wide range and are determined by trial and error to provide a reverse buckling rupture disk 10 having the desired reversal pressure and strength characteristics.

An example of a reinforced low pressure reverse buckling rupture disk of the present invention is formed of stainless steel having a thickness of 0.00125 inch. The diameter of the concave-convex portion 14 is 1.460 inches and the concave-convex portion has a crown height, i.e., a height from the bottom surface of the disk to the apex of the inside surface of the concave-convex portion of 0.335 inch. The annular flat flange portion 16 connected to the concave-convex portion 14 is 1.750 inch wide. The embossments 18 are each 0.180 inch long, 0.030 inch wide and 0.050 inch high and are positioned on a centrally positioned circular line having a diameter of 1.100 inch. The spacing between the ends of adjacent embossments 18 is 0.108 inch.

The above-described reinforced low pressure rupture disk has resistance to damage and will withstand full vacuum and the reverse pressure created thereby without distortion. When the force exerted on the rupture disk 10 changes from vacuum to positive pressure, the rupture disk will reverse and rupture at a positive pressure of about 10 psig. The term "reverse pressure" is used herein to mean a pressure differential exerted on the rupture disk whereby the pressure on the concave side thereof is higher than the pressure on the convex side thereof.

Figure 4:
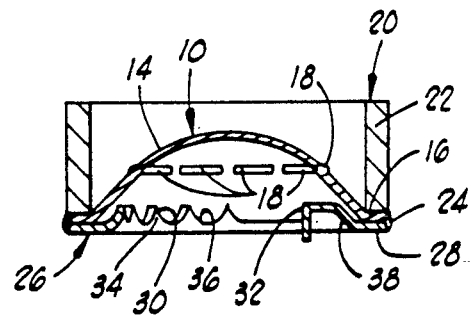
FIG. 4 is a side cross-sectional view taken along line 4—4 of FIG. 3.
Figure 5:
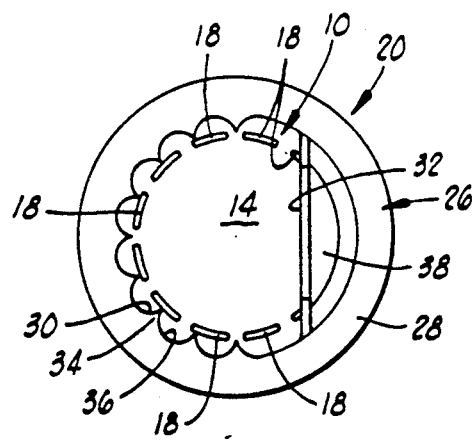
FIG. 5 is a bottom view of the assembly of FIGS. 3 and 4.

Referring now to FIGS. 3-6, a rupture disk assembly of this invention including the rupture disk 10 described above is illustrated and generally referred to by the numeral 20. The assembly 20 is comprised of a cylindrical inlet support and protection member 22 attached to the annular flat flange portion 16 of the rupture disk 10 such as by a continuous weld 24. The inlet support member 22 is in turn welded or otherwise attached to a connection in a vessel or system containing pressurized fluid to be protected from over pressure. Positioned adjacent to the concave side of the rupture disk 10 and welded thereto by means of the weld 24 is a knife blade member 26. The knife blade member 26 has an annular flat flange portion 28, a partially circular serrated cutting edge 30 and a non-cutting interior edge 32. The annular flat flange portion 28 of the knife blade member 26 is of a size corresponding to the size of the annular flat flange portion 16 of the rupture disk 10. As best shown in FIG. 4, the partially circular serrated cutting edge 30 is positioned interiorly of the annular flat flange 16 of the rupture disk 10 whereby the transition connection between the concave-convex portion 14 and the annular flange portion 16 of the rupture disk 10 is supported thereby. Further, the serrations of the cutting edge 30 are formed in the shape of triangle-shaped teeth 34 with rounded notches 36 therebetween. The teeth 34 are preferably inclined toward and into the concave side of the concave-convex portion 14 of the rupture disk 10 at an angle in the range of from about 30° to about 45° from the plane of the flange portion 28.

The non-cutting interior edge 32 of the knife blade member 26 comprises a chord of the circle partially defined by the serrated cutting edge 30. The non-cutting edge 32 is defined by an integral channel shaped portion formed in the member 26 having a substantially vertical side.

Figure 6:
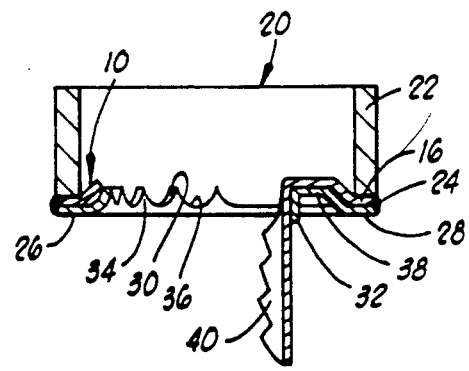
FIG. 6 is a cross-sectional view similar to FIG. 4 but showing the rupture disk after reversal and rupture has occurred.
Figure 7:
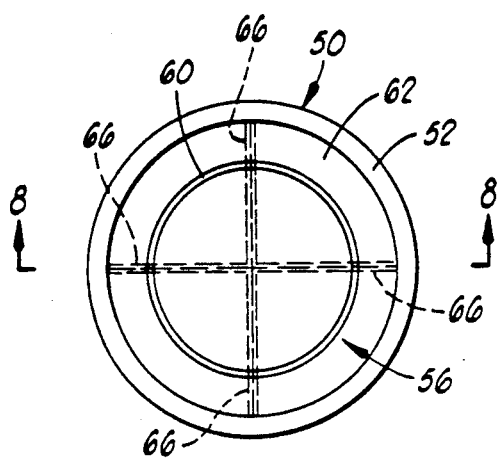
FIG. 7 is a top plan view of an alternate rupture disk assembly of the present invention.
Figure 8:
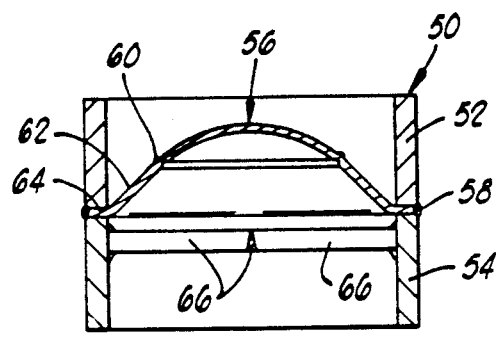
FIG. 8 is a cross-sectional view taken along line 8—8 of FIG. 7.
Figure 9:
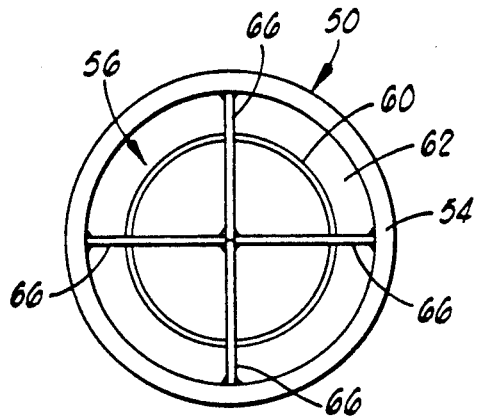
FIG. 9 is a bottom view of the assembly of FIGS. 7 and 8.

When the fluid pressure exerted on the convex side of the concave-convex portion 14 of the disk 10 reaches a predetermined level, the concave-convex portion reverses. Upon reversal, the part of the concave-convex portion 14 which reverses into the serrated cutting edge 30 is severed thereby. The severing of the concave-convex portion 14 continues until the cut reaches the non-cutting interior edge 32 at which point the partially severed part 40 of the concave-convex portion 14 bends inwardly about the non-cutting interior edge 32 of the member 26 as shown in FIG. 6. The unsevered integral hinge of the concave-convex portion 14 adjacent the non-cutting interior edge 32 retains the partially severed part 40 to prevent it from being carried downstream by the escaping pressurized fluids.

Referring now to FIGS. 7-10, an alternate form of the improved rupture disk assembly of the present invention is illustrated and generally designated by the numeral 50. The assembly 50 includes a cylindrical inlet support and protection member 52 and an outlet support and knife blade member 54 between which a reverse buckling rupture disk 56 of the present invention is clamped by means of a continuous weld 58. The rupture disk 56 includes a single continuous embossment 60 defining a centrally positioned circle in the concave-convex portion 62 thereof. The concave-convex portion 62 is connected to an annular flat flange portion 64 which is seal welded by the weld 58 to both the inlet and outlet support members 52 and 54.

Figure 10:
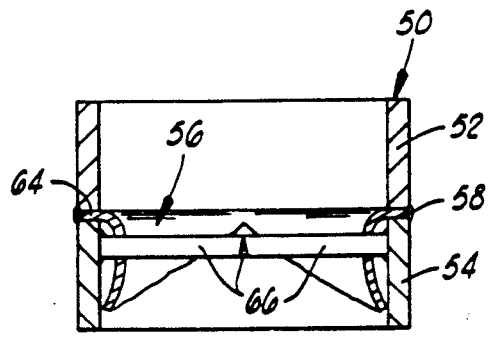
FIG. 10 is a cross-sectional view similar to FIG. 8 but showing the rupture disk after reversal and rupture.

The embossment 60 functions in the same manner as described above in connection with the disk 10 to reinforce the rupture disk 56 and prevent its deformation, premature failure, etc. Attached within the outlet support member 54 of the assembly 50 are a plurality of sharpened blade legs 66. The interior ends of the blade legs 66 are connected together and the exterior ends are connected to the interior walls of the outlet support member 54 such as by welding. When the rupture disk 56 reaches its design rupture pressure, the concave-convex portion 62 reverses and is severed by the sharpened knife blade legs 66 as shown in FIG. 10.

Thus the present invention is well adapted to carry out the objects and attain the ends and advantages mentioned as well as those inherent therein. While numerous changes in the construction and arrangement of parts can be made by those skilled in the art, such changes are encompassed within the spirit of this invention as defined by the appended claims.

What is claimed is:

1. An improved low pressure reverse buckling rupture disk comprising a concave-convex rupturable member having a thickness and a configuration such that said member reverses when a predetermined fluid pressure is exerted on the convex side thereof and having one or more reinforcing embossments disposed therein.

2. The rupture disk of claim 1 wherein said concaveconvex portion is connected to an annular flat flange portion and said embossments are disposed in said concave-convex portion.

3. The rupture disk of claim 1 wherein said embossments form a circular pattern in said rupturable member.

4. The rupture disk of claim 1 wherein said rupturable member includes a plurality of embossments therein.

5. The rupture disk of claim 2 wherein said rupturable member includes a plurality of embossments which are equally spaced in end-to-end relationship on a centrally positioned circular line.

6. An improved low pressure reverse buckling rupture disk assembly comprising:
   a reverse buckling rupture disk having one or more reinforcing embossments disposed therein; and
   knife blade means positioned adjacent to said rupture disk for severing said rupture disk upon the reverse buckling thereof.

7. The rupture disk assembly of claim 6 wherein said reverse buckling rupture disk includes a concave-convex portion connected to an annular flat flange portion and said embossments are disposed in said concave-convex portion.

8. The rupture disk assembly of claim 6 wherein said embossments form a circular pattern in said rupture disk.

9. The rupture disk assembly of claim 6 wherein said rupture disk includes a plurality of embossments therein.

10. The rupture disk assembly of claim 7 wherein said rupture disk includes a plurality of embossments which are equally spaced in end-to-end relationship on a circular line.

11. The rupture disk assembly of claim 6 wherein said knife blade means are comprised of an annular member having a plurality of sharpened blade legs attached thereto.

12. The rupture disk assembly of claim 6 wherein said knife blade means are comprised of an annular member having at least a partially circular cutting edge positioned interiorly of said annular flat flange portion of said rupture disk.

13. The rupture disk assembly of claim 12 wherein said cutting edge is serrated.

14. The rupture disk assembly of claim 13 wherein said annular member includes a non-cutting interior edge whereby a partially severed portion of said rupture disk bends about said non-cutting edge and remains attached to said rupture disk.

15. An improved low pressure reverse buckling rupture disk assembly comprising:
   a reverse buckling rupture disk having a concave-convex portion connected to an annular flat flange portion and having one or more reinforcing embossments disposed in the concave-convex portion; and
   knife blade means positioned adjacent to said rupture disk for severing said disk upon the reverse buckling thereof.

16. The rupture disk assembly of claim 15 wherein said embossments form a circular pattern in said rupture disk.

17. The rupture disk assembly of claim 15 wherein said rupture disk includes a plurality of embossments therein.

18. The rupture disk assembly of claim 17 wherein said embossments are equally spaced in end-to-end relationship on a centrally positioned circular line.

19. The rupture disk assembly of claim 18 wherein said knife blade means are comprised of an annular member having at least a partially circular serrated cutting edge positioned interiorly of said annular flat flange portion of said rupture disk.

20. The rupture disk assembly of claim 19 wherein said annular member includes a non-cutting interior edge whereby a partially severed portion of said rupture disk bends about said non-cutting edge and remains attached to said rupture disk.

* * * * *